United States Patent Office 3,706,714
Patented Dec. 19, 1972

3,706,714
POLYURETHANE POLYOLS
Rodney Frederick Lloyd and Michael Cuscurida, Austin, Tex., assignors to Jefferson Chemical Company, Inc., Houston, Tex.
No Drawing. Filed Feb. 2, 1971, Ser. No. 112,044
Int. Cl. C08g 22/14
U.S. Cl. 260—77.5 AP          5 Claims

ABSTRACT OF THE DISCLOSURE

Polyurethane polyols may be prepared to contain oxypropylene and oxyethylene linkages and also, pendant alkyl chains of 8 to 20 carbon atoms. The polyols may be used to prepare polyurethane products of unusual softness and low resistance to temporary deformation useful as caulks, sealants, gaskets, and other space filling materials.

BACKGROUND OF THE INVENTION

Field of the invention

This invention relates to the field of polyether polyurethane polyols.

Description of the prior art

The prior art is replete with examples of polyfunctional polyols which are condensation products of a polyfunctional active hydrogen initiator and ethylene oxide, propylene oxide, butylene oxide or mixtures of these alkylene oxides. These condensation products when reacted with an isocyanate make urethanes which are useful for many applications. One such application is in space filling materials, for instance, caulks, sealants, and gaskets. The prior art polyols leave much to be desired in these applications however. Sealants, etc., made with prior art polyols are often harder than desired and are resistant to stretching or other temporary deformation. As a result they may not form tight seals and may even release under tension or stress. These problems are alleviated by our invention. Our invention is a new class of polyether polyols which make polyurethane sealants of unusual softness and having low resistance to temporary deformation while retaining excellent resistance to permanent deformation. Thus, sealants may be made which are soft enough to easily take the shape desired and which will easily stretch and change shape if put under stress but which will return to its original shape when stress is removed.

The polyols of our invention are condensation products of a polyfunctional active hydrogen initiator and ethylene oxide, propylene oxide and alkylene oxides of 8 to 20 carbon atoms. Thus, the finished polyol molecule has long pendant alkyl chains attached to it. Due to these long pendant alkyl chains the polyols of our invention have shorter active end to active end chain distance than prior art polyols. Since polyols of shorter chain length normally have less flexibility, the polyurethane products made from such polyols are usually harder and stiffer. It was, therefore, surprising and unexpected to find that the polyols of this invention give polyurethane products having increased flexibility and softness as compared to prior art polyols of the same molecular weight and functionality.

SUMMARY OF THE INVENTION

The invention is a polyether polyol made by reacting a polyfunctional active hydrogen initiator with propylene oxide, ethylene oxide, and an alkylene oxide of from 8 to 20 carbon atoms. The invention is also the polyurethane product made by reacting such a polyol with an isocyanate.

DESCRIPTION OF THE PREFERRED EMBODIMENTS

The polyol of this invention is made using an initiator which may be any polyfunctional active hydrogen compound capable of reacting in a catalytic medium with ethylene oxide, propylene oxide or butylene oxide. For example primary amines and polyhydric alcohols are useful. The alcohols or amines may be of 2 to about 6 functionality. For example, propylene glycol, dipropylene glycol, glycerine, trimethylolpropane, and sorbitol are useful but are merely illustrative of the active hydrogen compounds useful as initiators for the polyol of our invention.

Both propylene oxide and ethylene oxide are to be used in polyols of our invention along with a long chained alkylene oxide which is normally available as a mixture of molecular weights. Long chained alkylene oxides of from 8 to 20 carbon atoms are useful, but it is preferred to use alkylene oxides of from 10–16 carbon atoms. The individual oxides (ethylene, propylene, and long chained) may be mixed and reacted at once to achieve a random distribution of ethylene oxide, propylene oxide and long chained alkylene oxides. The ethylene oxide may constitute from about 3 to 20% of the amount of propylene oxide. The long chained alkylene oxide may constitute from about 1 to 10% of the total molecule.

The manufacture of polyols by the reaction of alkylene oxides with an initiator is conducted using techniques known to those skilled in the art. See for example U.S. Pat. 2,948,757 and U.S. Pat. 3,000,963.

The other essential reactant in forming a polyurethane product is an isocyanate. The isocyanate may be difunctional such as toluene diisocyanate or the polyfunctional polyaryl isocyanates. The polyaryl isocyanates are produced, for example, by the phosgenation of the reaction product of aniline and formaldehyde. Such reactions are well known and are described in U.S. Pats. 3,344,162 and 3,362,979, for example. The polyaryl isocyanates thus formed have functionalities greater than two which can be varied up to the higher functionality materials. In practice, however, functionalities greater than four are attained only with difficulty. However, for the purpose of practicing our invention, materials with a functionality as high as five may be used. It is preferred that the functionality be from two to about four. Selection of the proper isocyanate is within the knowledge of those skilled in the art.

In addition a catalyst may or may not be required. The catalyst may be for example a tertiary amine, a metal salt such as stannous octoate, stannous oleate, dibutyltin dilaurate, lead octoate or phenylmercuric acetate.

Another group of catalysts useful in the practice of our invention are prepared by reacting stannic chloride, antimony trichloride, or mixtures thereof, with ethylene glycol to form a complex and dissolving the complex in a 2,000 molecular weight polypropylene glycol. For example such a catalyst has been prepared as follows: 256 grams of antimony trichloride and 324 grams of ethylene glycol were heated on a boiling water bath under nitrogen for 90 minutes. The mixture was then cooled in an ice bath and 200 ml. of stannic chloride added in small increments, keeping the temperature below 75° C. After the addition was completed and fuming ceased, 1,000 grams of a polyoxypropylene glycol having an average molecular weight of 2,000 was added to the slurry. The entire mixture was then placed on a hot water bath and stirred with heating until clear. A catalyst prepared in this manner was used to prepare the urethane polymers of Examples 4, 5, 6 and 8. It is referred to as "antimony-tin catalyst" in the examples.

The selection of catalyst is well within the knowledge of those skilled in the art.

Inert fillers and pigments may also be added, but these are also old in the art.

Our invention may be illustrated by the following examples which are illustrative of but in no way limit the scope of the invention.

The resistance to temporary deformation of the polyurethane materials of the following examples is shown by the tensile strength and in some cases the modulus. The tensile strength is the stress of a standard size piece of material when strained to its breaking point. The modulus is the stress of the same piece of material when subjected to a predetermined strain. That is, the 100% modulus is the stress of the material when the sample is elongated to twice its original length.

EXAMPLE 1

This example will illustrate the preparation of a 48 hydroxyl number, ethylene oxide-terminated diol prepared to contain five weight percent of a lauryl-myristyl range olefin oxide (Nedox® 1114 brand oxide, from ADM Chemical Co.). The use of this diol product to illustrate the features of the invention is shown in Examples 4 and 5 of this application.

Into a ten-gallon kettle were charged 7.5 pounds of a 400 molecular weight polyoxypropylene glycol and 225 grams of a 50% aqueous potassium hydroxide solution. The reactor was then evacuated and thoroughly purged with purified nitrogen gas. A mixture of 30.75 pounds propylene oxide and 2.25 pounds of Nedox® 1114 brand lauryl-myristyl range olefin oxide were reacted with the starter glycol in the kettle at 110–115° C. at 60 p.s.i.g. After digestion to equilibrium, the reaction mixture was purged with nitrogen for 30 minutes. Ethylene oxide (4.5 lbs.) was then reacted at 110–115° C. The alkaline product was neutralized at 95° C. with a solid organic acid. Di-t-butyl p-cresol (17.9 grams) was also added at this time, as was filter aid (150 grams). The neutralized product was then stripped to minimum pressure at 100° C., purged with nitrogen for 30 minutes, and filtered at 110° C.

The final product had the following properties:

| | |
|---|---|
| Acid No., mg. KOH/g. | 0.07 |
| Hydroxyl No., mg. KOH/g. | 48.1 |
| Water, wt. percent | 0.02 |
| Ash, wt. percent | 0.002 |
| Sodium, p.p.m. | 0.5 |
| Potassium, p.p.m. | 0.7 |
| Color, Pt-Co | 40 |
| pH in 10:6, isopropanol:water | 5.8 |

EXAMPLE 2

This example will illustrate the preparation of a 51.8 hydroxyl number, ethylene oxide-terminated, trimethylol-propane-based triol prepared to contain five weight percent lauryl-myristyl range olefin oxide. The use of this product to illustrate the features of this invention is shown in Examples 4 and 5.

The general procedure of Example 1 was used to prepare this triol. A 600 molecular weight propylene oxide adduct of trimethylolpropane was used as the initiator for this preparation. Reaction charges and physical properties of the product are as follows:

Charge:

| | |
|---|---|
| 600 molecular weight propylene oxide adduct of trimethylolpropane, lb. | 12 |
| Potassium hydroxide, flaked, g.[1] | 124 |
| Propylene oxide, lb.[2] | 49.2 |
| Nedox® 1114 lb.[2] | 3.6 |
| Ethylene oxide, lb. | 7.2 |
| Solid organic acid sufficient to neutralize: | |
| Di-t-butyl p-cresol, g. | 29.4 |
| Hyflo Supercel® filter aid, g. | 200 |

Properties:

| | |
|---|---|
| Acid No., mg. KOH/g. | 51.8 |
| Hydroxyl No., mg. KOH/g. | 51.8 |
| Water, wt. percent | 0.08 |
| Ash, wt. percent | Nil |
| Sodium, p.p.m. | 0.7 |
| Potassium, p.p.m. | 0.7 |
| Color, Pt-Co | 15–20 |
| pH in 10:6 isopropanol:water | 5.6 |

[1] Added as 50% aqueous solution.
[2] Mixed.

EXAMPLE 3

This example will illustrate the preparation of a 25.4 hydroxyl number diol prepared to contain an internal oxyethylene block and a propylene oxide-lauryl to myristyl range olefin oxide heteroblock. The use of this diol to illustrate the features of this invention is shown in Example 6. The general procedure of Example 1 was used to prepare this product. A 1000 molecular weight polyoxypropylene glycol was used as the initiator for this reaction.

Reaction charges and physical properties of the product are as follows:

Charge:

| | |
|---|---|
| 1000 molecular weight polyoxypropylene glycol, lb. | 15 |
| Potassium hydroxide, flaked, g.[1] | 77 |
| Propylene oxide, lb.[2] | 43.3 |
| Nedox® 1114, lb.[2] | 4.1 |
| Ethylene oxide, lb. | 4.1 |
| Propylene oxide, lb. | 15.7 |
| Solid organic acid sufficient to neutralize: | |
| Di-t-butyl p-cresol, g. | 33 |
| Hyflo Supercel® filter aid, g. | 150 |

Properties:

| | |
|---|---|
| Acid No., mg. KOH/g. | 0.03 |
| Hydroxyl No., mg. KOH/g. | 25.4 |
| Water, wt. percent | 0.03 |
| Ash, wt. percent | Nil |
| Sodium, p.p.m. | 0.3 |
| Potassium, p.p.m. | 2.2 |
| Color, Pt-Co | 30 |
| pH in 10:6, isopropanol:water | 5.9 |

[1] Added as 50% aqueous solution.
[2] Mixed.

EXAMPLE 4

(A) Preparation of Polymer A (using polyol of the invention)

This elastomer illustrates the use of a diol and a triol containing lauryl-myristyl olefin oxide in a polymeric product. The elastomer was prepared by using the following ingredients:

| Polyol component: | Parts |
|---|---|
| 2000 molecular weight diol containing five percent lauryl-myristyl range olefin oxide, described in Example 1 | 42.1 |
| 3000 molecular weight triol containing five percent lauryl-myristyl range olefin oxide, described in Example 2 | 4.7 |
| Clay filler (anhydrous) | 38.7 |
| Iron oxide, brown | 1.0 |
| Carbon black | 0.1 |
| Trimethylolpropane | 0.76 |
| Antimony-tin catalyst | 1.5 |
| Isocyanate component: | |
| Polyaryl isocyanate (2.7 functionality) | 11.1 |

The polyol component and isocyanate component were mixed together at room temperature until thoroughly blended, under vacuum, by mixing vigorously for thirty seconds. The reaction mixture was then poured into suitable molds and cured at 38° C. The polymer gelled in two minutes and had a tack-free surface in seven minutes.

After curing for a total of 24 hours the elastomeric product had a Shore A hardness of 79-80. The properties of this cured elastomer (Polymer A) are given in Table I below.

(B) Preparation of Polymer B (using prior art polyol)

A polyol-filler-catalyst blend was prepared using the recipe for the above polyol component of Polymer A, except the 2000 molecular weight diol and 3000 molecular weight triol used contained no lauryl-myristyl range olefin oxide. Mixing 600 parts of this blend with 83 parts of the same 2.7 functionality polyaryl isocyanate gave a mixture which cured rapidly to an elastomeric product (Polymer B), the properties of which are described in Table I.

As is evident from Table I, the incorporation of the lauryl-myristyl range olefin oxide into the polyols produced a softer elastomer having higher elongation and lower modulus than is obtained by the use of conventional polyols of the same molecular weight.

TABLE I

| | Polymer | |
|---|---|---|
| | A | B |
| Percent lauryl-myristyl range olefin oxide in polyol | 5 | None |
| Hardness, Shore $A_2$ | 79-80 | 85-86 |
| Tensile strength, p.s.i. | 837 | 1,039 |
| Elongation, percent | 73 | 47 |
| Tear strength, p.l.i. | 72 | 76 |
| Compression strength, 10% deflection, p.s.i. | 289 | 391 |
| Compression set, percent | 7.2 | |

EXAMPLE 5

(A) Preparation of Polymer C (using polyol of the invention)

A portion (87.8 parts) of the polyol-filler-catalyst nent from the preparation of Polymer A, Example 4, made from polyols containing 5 percent lauryl-myristyl range olefin oxide, was reacted with a 2.3 functionality polyaryl isocyanate (11 parts by weight) at an isocyanate to hydroxyl ratio of 1.25/1.00. This reaction mixture cured rapidly to an elastomeric product (Polymer C), the properties of which are outlined in Table II.

(B) Preparation of Polymer D (using prior art polyol)

A portion (87.8 parts) of the polyol-filler-catalyst blend used in the preparation of Polymer B, Example 4, was reacted with the same 2.3 functionality polyaryl isocyanate (12.2 parts) at an isocyanate to hydroxyl ratio of 1.25/1.00. This mixture cured rapidly to give an elastomeric product (Polymer D) having a Shore $A_2$ hardness of 79-81. The properties of Polymer D are listed in Table II.

As is evident from a comparison of Polymer C with Polymer D, the incorporation of lauryl-myristyl range olefin oxide into the polyols produced, when reacted with a polymeric isocyanate, an elastomer which was softer and had lower modulus and greater elongation than was produced from conventional polyols of the same molecular weight which do not contain the lauryl-myristyl range olefin oxides. Therefore elastomeric products are possible which have increased flexibility and softness so as to be useful in applications such as sealants where the ability to compress or expand with the motion of the connecting structural elements is essential.

TABLE II

| | Polymer | |
|---|---|---|
| | C | D |
| Percent lauryl-myristyl range olefin oxide in polyol | 5 | None |
| Hardness, Shore $A_2$ | 73-74 | 79-81 |
| Tensile strength, p.s.i. | 892 | 1,150 |
| 100% modulus, p.s.i. | 833 | |
| Elongation, percent | 123 | 91 |
| Tear strength, p.l.i. | 94 | 104 |
| Compression strength, 10% deflection, p.s.i. | 189 | 282 |

EXAMPLE 6

(A) Preparation of Polymer E (using polyol of the invention)

An elastomer was prepared from the following recipe:

Polyol component: Parts
- 4000 molecular weight diol containing five percent lauryl-myristyl range olefin oxide, described in Example 3 _____ 53.5
- Clay filler (anhydrous) _____ 36.7
- Iron oxide _____ 1.1
- Trimethylolpropane _____ 0.53
- Antimony-tin catalyst _____ 1.6

Isocyanate component:
- Polyaryl isocyanate (2.7 functionality) _____ 6.6

The polyol component and isocyanate component were mixed rapidly under vacuum at ambient temperature at an isocyanate to hydroxyl ratio of 1.1/1.0 to give a mixture which gelled in about twelve minutes. The properties of this elastomer (Polymer E) are described in Table III.

(B) Preparation of Polymer F (using prior art polyol)

An elastomeric product was prepared using the same method and proportions as outlined for Polymer E above, including the same 2.7 functionality polyaryl isocyanate, except the 4000 molecular weight polyol contained no lauryl-myristyl range olefin oxide. The properties of this elastomer (Polymer F) are listed in Table III. As can be seen, the incorporation of the lauryl-myristyl range olefin oxide produced a less viscous, more easily worked polyol component than obtained from conventional polyols. Upon reaction with a polymeric isocyanate, the polyol component containing the lauryl-myristyl olefin oxide cured to a soft, low modulus elastomeric product. It is unusual for a soft, flexible elastomer like Polymer E to have such low permanent compression set. These properties are especially advantageous in providing structural integrity for sealants where building movements place high demands on sealing materials.

TABLE III

| | Polymer | |
|---|---|---|
| | E | F |
| Percent lauryl-myristyl range olefin oxide in polyol | 5 | None |
| Viscosity of polyol component, 25° C., 12 r.p.m., centipoises | 6,000 | 8,750 |
| Hardness, Shore $A_2$ | 42-43 | 60-61 |
| Tensile strength, p.s.i. | 347 | 564 |
| 100% modulus, p.s.i. | 188 | 479 |
| Elongation, percent | 223 | 147 |
| Tear strength, p.l.i., dye C | 43 | 44 |
| Compression strength, 10% deflection, p.s.i. | 47 | 123 |
| Compression set, percent | 9.5 | 8.0 |

EXAMPLE 7

This example will illustrate the preparation of a 27 hydroxyl number, ethylene oxide terminated, trimethylolpropane-based triol prepared to contain five weight percent lauryl-myristyl olefin oxide. The use of this product is illustrated in Example 8. The general procedure of Example 1 was used to prepare this product. A 3000 molecular weight triol was used as the starter for this invention. This triol consisted of trimethylolpropane reacted with propylene oxide to a molecular weight of about 2750 and then this product reacted with ethylene oxide to 3000 molecular weight.

Reaction charges and physical properties of the product are as follows:

Charge:
- 3000 molecular weight triol, lb. _____ 20
- Potassium hydroxide, flaked g.[1] _____ 62
- Propylene oxide, lb.[2] _____ 26.5
- Nedox® 1114, lb.[2] _____ 2.7
- Ethylene oxide, lb. _____ 5.46
- Solid organic acid sufficient to neutralize:
  - Di-t-butyl p-cresol, g. _____ 22.3
  - Hyflo Supercel®, g. _____ 150

[1] Added as 50% aqueous solution.
[2] Mixed.

Properties:
- Acid No., mg. KOH/g. — 0.02
- Hydroxyl No., mg. KOH/g. — 27
- Water, wt. percent — Nil
- Ash, wt. percent — Nil
- Sodium, p.p.m. — 0.2
- Potassium, p.p.m. — 0.2
- Color, Pt-Co — 25
- pH in 10:6, isopropanol:water — 5.8

EXAMPLE 8

(A) Preparation of Polymer G (using polyol of the invention)

An elastomer was prepared from the following recipe:

Polyol component: Parts
- Triol described in Example 7, having 27 hydroxyl number and being approximately 6500 molecular weight and containing five percent lauryl-myristyl range olefin oxide — 53.6
- Clay filler (anhydrous) — 36.1
- Iron oxide — 1.0
- Carbon black — 0.1
- Trimethylolpropane — 0.47
- Antimony-tin catalyst — 1.8

Isocyanate component:
- Polyaryl isocyanate (2.3 functionality) — 7.0

The polyol component and the isocyanate component were mixed rapidly under vacuum at ambient temperature at an isocyanate to hydroxyl ratio of 1.15/1.0 to give a mixture which gelled in 3.75 minutes. The properties of this elastomer (Polymer G) are described in Table IV.

(B) Preparation of Polymer H (using prior art polyol)

An elastomer was prepared using the same method and proportions as outlined for Polymer G above including the same 2.3 functionality polyaryl isocyanate, except the 6500 molecular weight polyol contained no lauryl-myristyl range olefin oxide. The properties of this elastomer (Polymer H) are listed in Table IV. As can be seen, the incorporation of the lauryl-myristyl range olefin oxide into the polyol produced a filled polyol component which had lower viscosity and was more easily worked than obtained with a prior art polyol of the same molecular weight. Reacting the polyol components with polymeric isocyanate produced polyurethane elastomers which, when compared in Table IV, demonstrate advantages of greater softness, lower modulus and higher elongation for the polymer containing the lauryl-myristyl range olefin oxide (Polymer G); Polymer G also has excellent resistance to permanent compression set. These advantages are particularly important when these elastomers might be used as architectural sealants and spacers.

TABLE IV

| | Polymer | |
|---|---|---|
| | G | H |
| Percent lauryl-myristyl range olefin oxide in polyol | 5 | None |
| Viscosity of polyol component, 25° C., 12 r.p.m., centipoises | 3,750 | 9,500 |
| Hardness, Shore A₂ | 46–47 | 62–64 |
| Tensile strength, p.s.i. | 409 | 567 |
| 100% modulus, p.s.i. | 245 | 513 |
| Elongation, percent | 227 | 130 |
| Tear strength, p.l.i., dye C | 57 | 51 |
| Compression strength, 10% deflection, p.s.i. | 62 | 138 |
| Compression set, percent | 7.0 | 7.6 |

We claim:

1. A polyurethane elastomer composition made by the reaction of an organic polyisocyanate with a polyether polyol wherein the polyether polyol is the reaction product of a polyfunctional active hydrogen initiator and propylene oxide, ethylene oxide and an alkylene oxide of 8 to 20 carbon atoms.

2. A polyurethane product of claim 1 wherein the polyfunctional active hydrogen initiator for the polyol is a polyhydric alcohol, the alkylene oxide of 8 to 20 carbon atoms is 1 to 10% of the total polyol molecule and the molecular weight of the polyol ranges from 1000 to 10,000.

3. The polyurethane product of claim 1 wherein the functionality of the polyol is from two to four and the molecular weight of the polyol per functionality group ranges from 500 to 2500.

4. The polyurethane product of claim 1 wherein the polyol is a diol of 1000 to 5000 molecular weight.

5. The polyurethane product of claim 1 wherein the polyol is a triol of 2000 to 7500 molecular weight.

References Cited

UNITED STATES PATENTS 3,467,605  9/1969  Abercrombie et al. — 260—77.5 AP
3,594,352  7/1971  Lloyd et al. — 260—77.5 AP DONALD E. CZAJA, Primary Examiner M. J. WELSH, Assistant Examiner U.S. Cl. X.R.

260—615 B

UNITED STATES PATENT OFFICE

CERTIFICATE OF CORRECTION

Patent No. 3,706,714           Dated December 19, 1972

Rodney Frederick Lloyd and Michael Cuscurida
Assignors to Jefferson Chemical Company, Inc.
Houston, Texas, a corporation of Delaware It is certified that errors appear in the above-identified patent and that Letters Patent are hereby corrected as shown below:

In column 4, line 2, "51.8" should read -- 0.06 --.
In column 5, line 35, "A portion (87.8 parts) of the polyol-filler-catalyst" should read -- A portion (89 parts by weight) of the polyol compo- --.

Signed and sealed this 22nd day of May 1973.

(SEAL)
Attest:

EDWARD M. FLETCHER, JR.           ROBERT GOTTSCHALK
Attesting Officer           Commissioner of Patents